June 5, 1956   A. R. WILLARD ET AL   2,748,737
MACHINE FOR MANUFACTURING STORAGE BATTERIES
Filed Jan. 6, 1950   3 Sheets-Sheet 1

INVENTORS
ALFRED R. WILLARD
FRED C. HAAK
BY HENRY W. LORMOR
Hudson, Boughton,
Williams, David & Hoffmann
ATTORNEYS June 5, 1956　　A. R. WILLARD ET AL　　2,748,737
MACHINE FOR MANUFACTURING STORAGE BATTERIES
Filed Jan. 6, 1950　　3 Sheets-Sheet 3

INVENTORS
ALFRED R. WILLARD
FRED C. HAAK
HENRY W. LORMOR
BY Hudson, Boughton,
Williams, David & Hoffmann
ATTORNEYS

United States Patent Office 2,748,737
Patented June 5, 1956

2,748,737

MACHINE FOR MANUFACTURING STORAGE BATTERIES

Alfred R. Willard, East Cleveland, Fred C. Haak, Euclid, and Henry W. Lormor, Shaker Heights, Ohio, assignors to The Electric Storage Battery Company, a corporation of New Jersey Application January 6, 1950, Serial No. 137,214

14 Claims. (Cl. 113—59)

The present invention relates to a method and apparatus for the manufacture of storage batteries and, more particularly, to the manufacture of storage battery elements.

The principal object of the invention is the provision of a new and improved method of manufacturing storage battery elements which comprises assembling an element of positive and negative plates having a separator between each plate and substantially simultaneously burning plate connecting straps to the terminal lugs of the positive and negative plates, respectively.

Another object of the invention is the provision of a new and improved apparatus for burning plate connecting straps to the plates of storage battery elements, which apparatus comprises an endless conveyor having a plurality of element holders each of which has two side abutments between which unburned element assemblies may be positioned, automatic means for moving one of the abutments toward and from the other to clamp elements in the holders throughout a certain path of travel of the conveyor and to release the elements at a predetermined point, and connector strap burning means arranged to burn straps to elements in the holders.

A further object of the invention is the provision of a new and improved baffle device for application to battery elements to shield the element plates proper from the burning flames and molten metal during the burning of plate connecting straps to the plate lugs.

A still further object of the invention is the provision of a new and improved shield device for shielding the plates of battery elements from the burning flames and molten metal during burning of the plate connecting straps, which device provides a template for positioning the plate connecting straps on the elements and which may be easily applied to and removed from the elements.

The invention resides in certain constructions and combinations and arrangements of parts and steps of process and further objects and advantages will be apparent to those skilled in the art to which it relates from the following description of a preferred embodiment described with reference to the accompanying drawings forming a part of this specification, in which.

Figure 1:
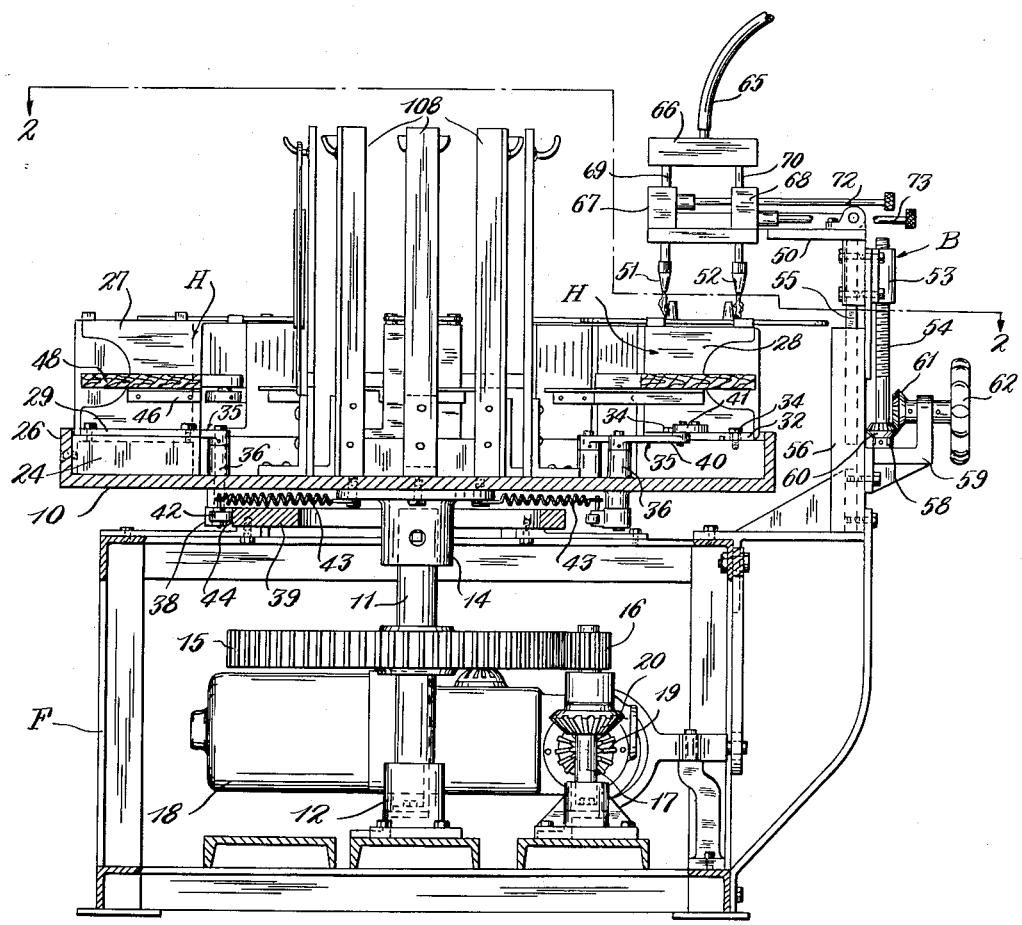
Fig. 1 is a vertical sectional view of a machine for burning plate connecting straps to storage battery plates, assembled with separators into elements, the section being taken substantially along line 1—1 of Fig. 2.

The invention contemplates the formation of a battery element by simultaneously burning plate connecting straps to the terminal lugs of positive and negative plates assembled with separators as an element, and provides apparatus for holding the elements and burning the connecting straps to the plates. Generally, the apparatus comprises an endless conveyor, preferably in the form of a circular turntable, having battery element holding devices thereon which are adapted to receive and clamp or compress assembled but unburned battery elements therebetween and successively pass the elements through stations at which the plate connecting straps are placed in proper relation with the plate lugs and then subjected to heating means for burning the straps to the lugs. The battery element holders are actuated automatically to release the burned elements adjacent to the loading station of the conveyor.

Referring to the drawings, a burning machine is shown comprising a frame F having a circular turntable 10 rotatably supported thereon by a vertical drive shaft 11. The lower end of the shaft 11 is journalled in a thrust bearing 12 and the upper end is attached to a hub 14 on the turntable. A ring gear 15 is attached to the shaft and is driven by a pinion gear 16 on a shaft 17, which shaft is driven by an electric motor 18 through bevel gears 19, 20. Motor 18 is adapted to drive shaft 11 at a relatively slow rate, for example, one-half revolution per minute, to rotate the turntable to convey storage battery elements through various stations in the process of manufacturing the elements.

In the embodiment of the invention shown, the turntable 10 supports nine battery element holders H although more or fewer holders could be employed, and the holders are equally spaced around the turntable. Each of the holders H comprises an inverted, channel-shaped platform member 24 attached to the turntable 10 by bolts 25, the forward end of which platform abuts an upstanding peripherial flange 26 of the turntable. The member 24 provides a floor on which the battery elements rest edgewise and two vertical side plates 27, 28 are supported on the member 24 to hold the elements in assembled form. The side plate 27 has a flange 29 which is bolted to the member 24, and the rear portion thereof is turned inwardly to form a rear wall 30 of the holder. Plate 28 has a laterally extending bottom flange 32 slidably supported on the member 24 and having elongated openings 33 through which bolts 34 extend, which bolts are threaded into member 24 and serve to guide plate 28 in sliding movements toward and from side plate 27. Preferably, the forward edges of the plates 27, 28 are recessed to facilitate manual insertion and removal of battery elements from between the plates.

Figure 2:
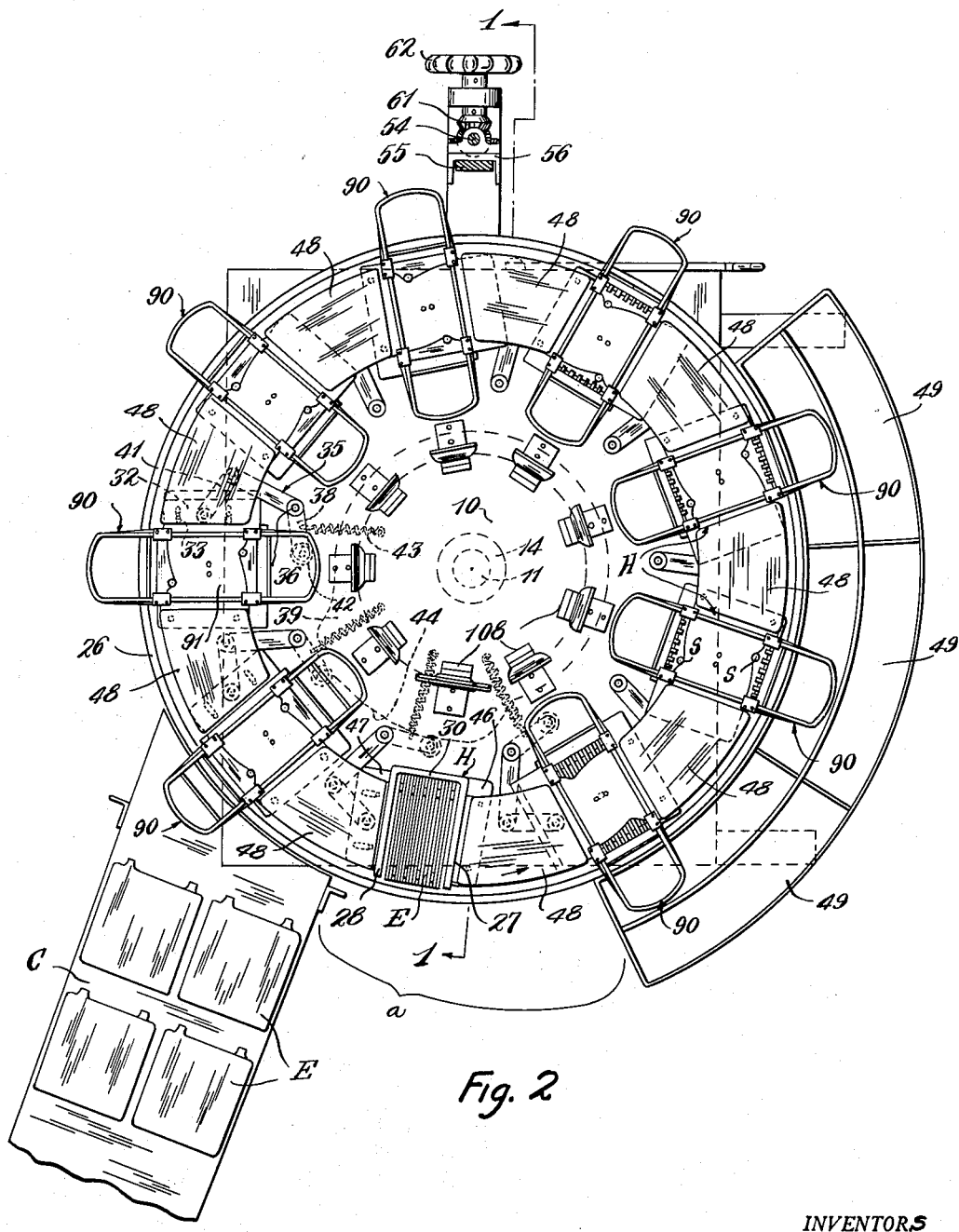
Fig. 2 is a sectional view taken substantially along line 2—2 of Fig. 1.
Figure 3:
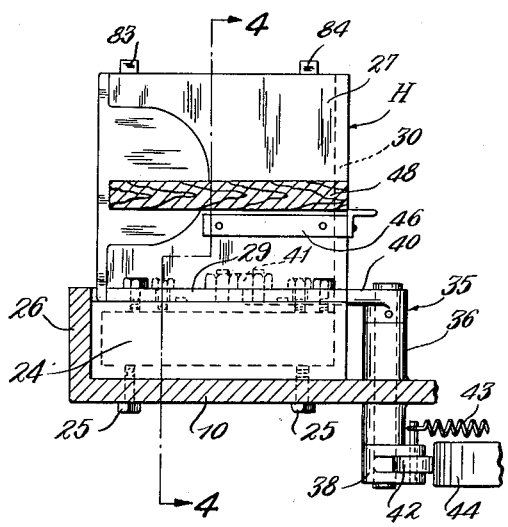
Fig. 3 is a fragmentary sectional view of the plate connecting strap burning machine taken substantially along line 3—3 of Fig. 4, showing a battery element holder.
Figure 4:
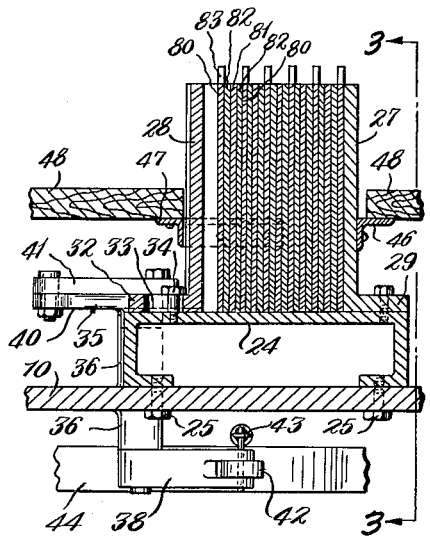
Fig. 4 is a view taken substantially along line 4—4 of Fig. 3.

Each of the side plates 28 is adapted to be moved toward and from plate 27 by a crank 35 which is journalled in a bearing 36 on the turntable 10 and which has an arm 38 adapted to be oscillated by a cam 39 as the turntable rotates and a second arm 40 connected with the side plate by a link 41. Preferably, arm 38 has a roller 42 on the end thereof which engages the cam to minimize friction. Arm 38 is urged counterclockwise, as viewed in Fig. 2, by a tension spring 43 to yieldingly urge plate 28 toward plate 27 and compress battery elements placed between the plates when the crank is disengaged from the cam. When crank arm 38 engages the cam 39 it is rotated clockwise, as seen in Fig. 2, and moves plate 28 from plate 27 to release the battery element.

Preferably, side plates 27, 28 have horizontally extending flanges 46, 47 attached thereto and insulating boards 48, which may be of asbestos, are secured to flange 46 and rest on flange 47 to shield the crank and link mechanisms from the plate connecting strap burning flames.

The mechanism described forms a conveyor for battery elements which moves the elements in a circular path, during which movement, various operations may be performed on the elements carried thereby. In the machine shown, the incomplete elements E are loaded into the holders H and the finished elements are removed therefrom at a point opposite the cam. Preferably, a conveyor C is provided for feeding the partially assembled elements E to the turntable mechanism.

Arcuate bins 49 are disposed at one side of the turntable and contain plate connecting straps to be placed on the elements as they move by the bins.

A burning mechanism B is provided beyond the bins 49 and it comprises one or more burner units, only one of which is shown, each including a bracket 50 which supports two burner nozzles 51, 52. The bracket 50 may be moved vertically to adjust the position of the burner nozzles relative to the battery elements and to this end it has a tapped socket 53 into which a shaft 54 is threaded. A bar 55 is attached to bracket 50 and extends between the flanges of channel iron 56 to prevent rotation of the bracket 50 by shaft 54. Shaft 54 is journalled in a bearing 58 on an L-shaped bracket 59 and has a beveled gear 60 connected thereon which is driven by a beveled gear 61 rotated by a hand knob 62 supported on the bracket 59. It will be apparent that the elevation of the nozzles can be adjusted by rotating knob 62 in one direction or the other.

Fuel gas is supplied to the nozzles 51, 52 through a flexible tube 65, manifold 66 and valves 67, 68 which are preferably regulated by adjusting knobs 72, 73. The nozzles 51, 52 are so spaced that they direct flames into the plate connecting straps and plate lugs at each end of the elements in the holders passing beneath the nozzle, and the intensity of the flames may be regulated by adjusting knobs 72, 73.

In manufacturing the battery elements E, negative and positive battery plates 80, 81 are stacked alternately having suitable separators 82 therebetween. Any desired number of plates may be used in forming the elements depending upon the cell capacity desired, but the number of battery plates and the spacing of side plates 27, 28 of the element holders is such that the elements may be inserted between the side plates when the plate 28 is in the spread position and compressed between the holder plates when plate 28 is moved by spring 43 as crank 35 leaves the cam. The plates 80, 81 are arranged so that all of the positive plate terminal lugs 83 are at one end of the element and all of the negative plate terminal lugs 84 are at the opposite end. The terminal lugs 83, 84 project beyond the separator edges which extend slightly beyond the edges of the plates. During the interval the holders H pass the cam 39 the loosely assembled elements are inserted edgewise in the holders H and are forced against the back walls to align the plates thereof. As the turntable 10 moves counterclockwise, as seen in Fig. 2, from the cam 39, side plates 28 are urged inwardly and compact the cell plates of the elements, after which an operator places a baffle device 90, referred to as a comb, over the tops of the elements.

Figure 5:
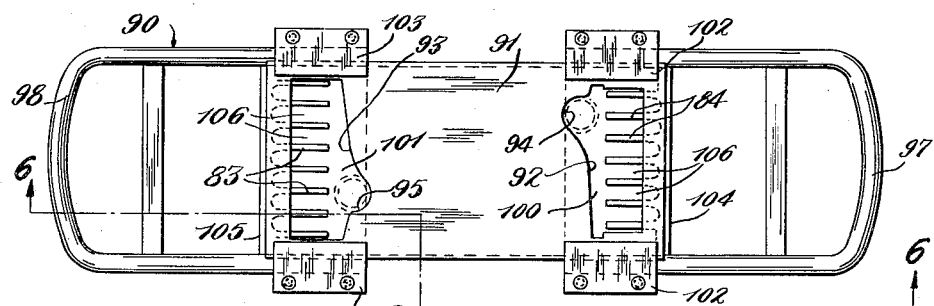
Fig. 5 is a plan view of a battery element assembly having a comb device associated therewith preparatory to burning connector straps to the lugs of the element plates.
Figure 6:
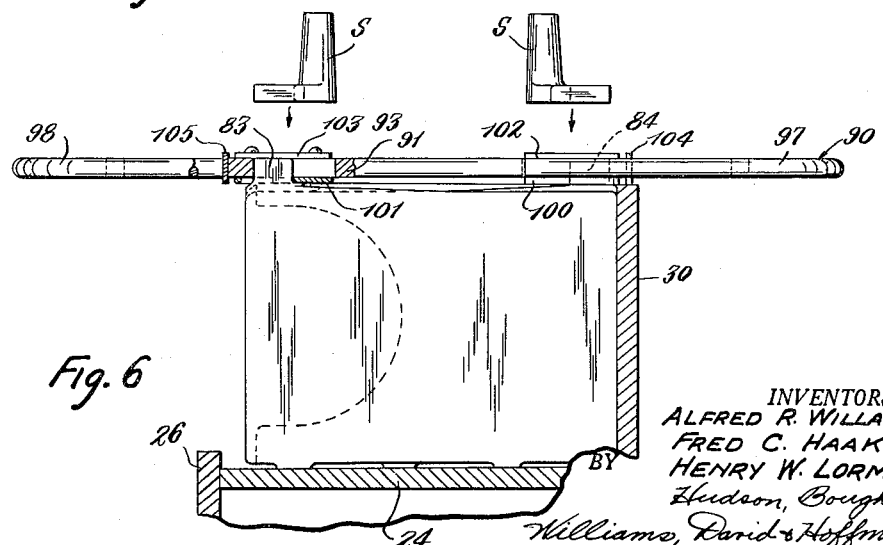
Fig. 6 is a view, partly in section, taken substantially along the line 6—6 of Fig. 5.

The baffle or comb device 90 comprises a plate 91 having openings 92, 93 adjacent to the ends thereof. The outer edges of the openings are straight and are adapted to abut the end edges of the battery plate lugs 83, 84 and the opposite edges of the respective openings have recesses 94, 95 adapted to receive the base portions of the post structures of the plate connecting straps. The side edges of plate 91 are grooved and the legs of U-shaped handle members 97, 98 are slidingly engaged in the grooves. The handles 97, 98 have thin comb plates 100, 101 attached to the undersides thereof and retainer plates 102, 103 are riveted to the comb plates and ride on the upper sides of the handle legs to assist in holding the handles to plate 91. The comb plates 100, 101 have teeth or prongs 106 which closely receive the plate terminal lugs 83, 84 therebetween. By moving the handle members 97, 98 inwardly of plate 91 from the position shown in Fig. 5, the comb plates 100, 101 are moved out of registration with the openings 92, 93 to enable the plate 91 to be easily applied to or removed from the element. After the plate 91 is positioned on the cell element with the terminal lugs 83, 84 in openings 92, 93 the handles 97, 98 are drawn outwardly moving the teeth 106 of comb plates 100, 101 between the terminal lugs and over the upper edges of the separators. Stop members 104, 105 are attached at the ends of plate 91 to limit outward movement of the handles 97, 98. The comb plates 100, 101 form baffles in the openings 92, 93 through which the terminal lugs project so that when the plate connecting straps and lugs are burned the molten metal is retained in the area of the lugs and the element plates proper are shielded from the burning flames. The comb plates 100, 101 occupy a minimum of space between the separator edges and the connecting straps so that the separators are in their normal positions during burning of the straps to the plates.

For convenience, vertical posts 108 are provided on turntable 10 at the rear of the respective holders H, which posts have hooks by which the comb devices 90 can be suspended when not in use. The comb devices 90 are applied to the elements just prior to the positioning of the connector straps S on the elements and the contour of the openings 92, 93 in the comb devices corresponds to the general shape of the bases of the connector straps except for the teeth of the connector straps which fit between the cell plate terminal lugs 83, 84. The plate connecting straps rest on the comb plates 100, 101, and as the elements having the connecting straps positioned thereon move beneath the burner nozzles 51, 52 the metal of the straps and terminal lugs is melted and fused, welding the straps to the element plates. The comb plates 100, 101 maintain proper spacing between the element plates and prevent the molten metal from flowing downwardly thereon.

As the cell elements approach the loading station following the post burning operation, the molten metal solidifies and the comb devices are removed therefrom. As crank arm 38 engages cam 39 side plate 28 is moved to release the battery elements and the completed battery elements are then removed from their holders.

It will be seen that by our invention we have provided a new and improved method and apparatus which expedites the manufacture of battery elements by simultaneously burning the plate connecting straps to the cell plates assembled as an element. The apparatus is relatively compact and can be manned by a minimum of operators. While we have described a preferred embodiment of the invention, it is our intention to cover all adaptations, modifications and changes therein which come within the practice of those skilled in the art to which the invention relates and the scope of the appended claims.

Having thus described our invention, we claim:

1. An apparatus for burning plate connecting straps to assembled battery elements comprising a frame, conveyor means on said frame movable in a closed path, a plurality of battery element holders mounted on said conveyor means for holding a battery element in position thereon and carried thereby through successive stations including an element holder loading station and a plate connecting strap burning station, said holders each comprising a substantially horizontal means connected to said conveyor and defining a substantially horizontal base, a first abutment means defining a wall extending perpendicularly from said conveyor means and rigidly connected to said conveyor means, a second abutment means defining a wall parallel to and opposed in clamping relationship to the wall defined by the first abutment means, means supporting said second abutment means on said conveyor means for limited movement toward and from the first abutment means, and means connected to said second abutment means for yieldably urging said second abutment means toward said first abutment means whereby an unburned assembled battery element may be placed in an upright position between the first and second abutment means with the latter engaging the faces of the end plates of the element to yieldably clamp the plates and separators together, burning means supported on said frame at an elevation above said holders and comprising said burning station for burning together the plate connecting straps and the plate lugs as the element holders are carried successively through said burning station by said conveyor means, means including cam means on said frame operative to move said second abutment means away from the other to permit insertion and removal of an assembled battery element, said cam means being on said frame relative to said burning means in a position such that the said second abutment means of each holder is permitted to move to its element clamping position as the respective holders approach said burning station and the said second abutment means of each holder is moved by said cam means away from said first abutment means to release the battery element therebetween as the respective holders pass said burning station and move through said loading station.

2. An apparatus for burning plate connecting straps to assembled battery elements comprising a frame, a turntable rotatably supported on said frame, driving means for rotating said turntable, a plurality of battery element holders supported upon the said turntable in circumferentially spaced relationship, each of said holders including means connected to said turntable defining a substantially horizontal base for supporting an assembled element, a first vertically extending wall member rigidly connected to said turntable at one side of said base, a second vertically extending wall member on said turntable on an opposite side of said base to the first-mentioned side in spaced parallel relationship with respect to the first wall member, means supporting said second wall member for movement toward and from the said first wall member, spring means connected to each of said second wall members for yieldably urging the latter towards the adjacent first wall member to effect clamping action perpendicularly of the end faces of a battery element placed between said wall members, cam means stationarily supported by said frame adjacent said turntable with a surface thereof successively cooperating with said second wall members to move the second wall members away from the first wall members during a portion of the rotation of said turntable, and burning means supported on said frame above the path of movement of said holders for sequential cooperation with battery elements clamped in the holders as the latter are carried by said turntable; whereby an assembled unburned battery element may be introduced into each of said holders in vertical upright position as said cam means maintains said second wall at its maximum distance from the first wall of the holder, the elements thus introduced are thereafter automatically clamped in position by said spring means as the holders approach and pass beneath said burner means, and the said cam means moves the said second wall members to element releasing position after the holders have passed said burning means.

3. An apparatus for burning plate connecting straps to assembled non-connected battery elements comprising a frame, a turntable rotatably supported on said frame, driving means for rotating said turntable, a plurality of battery element holders mounted on said turntable and adapted to be carried thereby through a closed path having successive stations including a loading station and a burning station, said holders each comprising a horizontal platform and two oppositely disposed vertical side walls adapted to receive an unburned battery element in an upright position and resting on said platform, means supporting one of said walls for movement to and from the other of said walls, and spring means urging said one of said vertical walls toward the other of said walls to clamp the battery element positioned between said walls, said spring means including linkage connected to said one wall and extending laterally thereof, torch means carried by said frame above said holders and arranged to direct flames downwardly on the upper parts of the elements in the holders for burning plate connecting straps to the elements as the elements move in said holders through said burning station, a plate of flame resistant material supported intermediate each of said holders and extending horizontally above said linkage to shield the latter from the flame of said torch means, first cam means connected to each of said linkages and operable therethrough to move said one wall in opposition to said spring means of each holder, and second cam means stationarily supported on said frame and cooperating with said first cam means to sequentially move said one wall of each holder in opposition to said spring means thereby releasing the battery element clamped between the walls of the respective holders as the latter leave said burning station and to prevent movement of said one wall towards the other wall by said spring means until said holders pass the loading station.

4. A burning iron or baffle device for protecting the plates and separators of an assembled lead-acid type battery element during the burning of plate connector straps to vertically extending plate connector lugs on the plates comprising frame means adapted to be lowered on to the assembled element having an enclosed opening adjacent one end thereof to receive the vertically extending plate connector lugs of a plurality of battery plates of an assembled battery element and a plate connecting strap, said plate connector lugs being positioned transversely of said frame means in spaced side-by-side relationship and said opening having a side adjacent to and extending along said one end adapted to substantially abut the outer edges of plate connector lugs positioned in the opening, means for closing the bottom of said opening comprising a thin comb plate extending transversely of said frame means, means slidably supporting said comb plate adjacent to the underside of said frame means for sliding movement from a position adjacent to the side of said opening remote from said one end to a position substantially closing said opening, said comb plate having prongs extending from one edge thereof toward said one end adapted to register with the spaces between the connector lugs and spaced apart a distance equal to the thickness of a plate connector lug so as to pass between plate connector lugs positioned in said opening and closely fit the adjacent plate connector lugs to close the space therebetween, and means for moving said comb plate between its positions.

5. A burning iron or baffle device for protecting the plates and separators of an assembled lead-acid type battery element during the burning of plate connector straps to vertically extending side-by-side plate connector lugs on the plates, said device comprising a rectangular plate-like member adapted to be lowered onto the assembled battery element having an enclosed opening adjacent one edge thereof to receive the vertically extending plate connector lugs of a plurality of battery plates of an assembled battery element and a plate connecting strap to be connected thereto, said opening having substantially the configuration of the connecting strap with at least a single straight side wall adjacent said edge of said plate-like member, means for closing the bottom of said opening comprising a thin comb plate adjacent the side of said opening remote from said one edge, means for slidably supporting said comb plate on said member for sliding movement from a position clear of said opening and adjacent to the side of said opening remote from said one edge to a position substantially closing said opening, said comb plate having prongs adapted to register with the spaces between the connector lugs extending from the edge thereof adjacent said one edge of said member toward said one edge of said member and spaced apart a distance substantially equal to a plate connector lug so as to pass between plate connector lugs positioned in said opening and closely fit the adjacent plate connector lugs to close the space therebetween, and means connected to said comb plate for moving the latter between its positions.

6. A burning iron or baffle device for protecting the plates and separators of an assembled lead-acid type battery element during the burning of plate connector straps to vertically extending side-by-side plate connector lugs on the plates, said device comprising a rectangular plate-like member adapted to be lowered onto the assembled battery element having an enclosed opening adjacent one edge thereof to receive the vertically extending plate connector lugs of a plurality of battery plates of an assembled battery element and a plate connecting strap to be connected thereto, said opening having substantially the configuration of the connecting strap with at least a single straight side wall adjacent said edge of said plate-like member, means for closing the bottom of said opening comprising a thin comb plate adjacent the side of said opening remote from said one edge, means for slidably supporting said comb plate on said member for sliding movement from a position clear of said opening and adjacent to the side of said opening remote from said one edge to a position substantially closing said opening, said comb plate having prongs adapted to register with the spaces between the connector lugs extending from the edge thereof adjacent said one edge of said member toward said one edge of said member and spaced apart a distance substantially equal to a plate connector lug so as to pass between plate connector lugs positioned in said opening and closely fit the adjacent plate connector lugs to close the space therebetween, and handle means connected to said comb plate and extending outwardly therefrom for operating the latter.

7. A burning iron or baffle device for protecting the plates and separators of an assembled lead-acid type battery element during the burning of plate connector straps to the plate connector lugs of the respective positive and negative plate groups, said device comprising a frame member adapted to be lowered onto the assembled battery element and having first and second spaced enclosed openings adjacent opposite edges thereof adapted to receive respectively the vertically extending side-by-side plate connector lugs of positive battery plates and negative battery plates of an assembled battery element and positive and negative plate connecting straps, said openings each having a straight side adjacent to and extending along the adjacent edge of said opposite edges and adapted to substantially abut the outer edges of the plate connector lugs received by the opening, means for closing the bottoms of said openings comprising first and second comb plates intermediate said openings adjacent to the bottoms thereof, means mounting said comb plates adjacent the underside of said frame member for movement from a position intermediate said openings to a position for closing the respective openings, said comb plates having spaced prongs extending in the direction of the opening closed thereby and spaced apart a distance substantially equal to the thickness of a lug so as to pass between the plate connector lugs positioned in the opening and closely fit the adjacent plate connector lugs to substantially close the opening, and means connected to said comb plates for moving the latter between their respective positions.

8. A burning iron or baffle device for protecting the plates and separators of an assembled lead-acid type battery element during the burning of plate connector straps to the plate connector lugs of the respective positive and negative plate groups, said device comprising a frame adapted to be lowered over an assembled battery element and having first and second spaced enclosed openings adjacent opposite edges thereof adapted to receive respectively the vertically extending side-by-side plate connector lugs of positive battery plates and negative battery plates of an assembled battery element and positive and negative plate connecting straps, said openings each having a straight side adjacent to and extending along the adjacent edge of said opposite edges and adapted to abut the outer edges of the plate connector lugs received by the opening and each having substantially the configuration of the connecting strap to be connected to the plate connector lugs, means for closing the bottoms of said first and second openings comprising first and second comb plates respectively intermediate said openings adjacent to the bottoms thereof, means mounting each of said comb plates adjacent the underside of said frame for movement from a position intermediate said openings to a position for closing the respective openings, said comb plates having uniformly spaced prongs extending in the direction of the opening closed thereby adapted to register with the spaces between connector lugs in the opening and spaced apart substantially the thickness of a connector lug so as to pass between the plate connector lugs positioned in the opening and closely fit the adjacent plate connector lugs to substantially close the opening, and means connected to said comb plates for moving the latter relative to said frame.

9. A burning iron or baffle device for protecting the plates and separators of an assembled lead-acid type battery element during the burning of plate connector straps to the plate connector lugs of the respective positive and negative plate groups, said device comprising a frame adapted to be lowered over an assembled battery element and having first and second spaced enclosed openings adjacent opposite edges thereof adapted to receive respectively the vertically extending side-by-side plate connector lugs of positive battery plates and negative battery plates of an assembled battery element and positive and negative plate connecting straps, said openings each having a straight side adjacent to and extending along the adjacent edge of said opposite edges and adapted to abut the outer edges of the plate connector lugs received by the opening and each having substantially the configuration of the connecting strap to be connected to the plate connector lugs, means for closing the bottoms of said first and second openings comprising first and second comb plates respectively intermediate said openings adjacent to the bottoms thereof, means mounting each of said comb plates on said frame for movement from a position intermediate said openings to a position for closing the respective openings, said comb plates having uniformly spaced prongs extending in the direction of the opening closed thereby adapted to register with the spaces between connector lugs in the opening and spaced apart substantially the thickness of a connector lug so as to pass between the plate connector lugs positioned in the opening and closely fit the adjacent plate connector lugs to substantially close the opening, and handle means connected to each of said comb plates extending outwardly of the latter for operating the latter between their positions.

10. In an apparatus for burning plate connector straps to an assembled lead-acid type battery element, a frame, a battery element holder on said frame comprising means defining a horizontal base for supporting battery elements, first and second spaced opposed abutment means extending perpendicularly to said means defining a base, each of said abutment means defining a wall with the walls of said abutment means being parallel and adapted to receive therebetween an assembled battery element positioned in an upright position on said means defining a base with the bottoms of the plate separators flush with the bottoms of the positive and negative plates and with the faces of the plates parallel with the walls defined by said abutment means, means supporting one of said abutment means for movement toward and away from said other abutment means, cam means connected to said one abutment means operable for moving said one abutment means away from said other abutment means, spring means for yieldably urging said one abutment means toward said other means, and means on said frame adapted to cooperate with said cam means for moving said one abutment means against the action of said spring means and means extending between said first and second abutment means for closing the top of the space between said abutment means when said abutment means are in a position clamping an assembled battery element therebetween comprising frame means adapted to be lowered on to the assembled element having a plurality of enclosed opening adjacent opposite ends thereof to receive the vertically extending plate connector lugs of a plurality of battery plates of an assembled battery element and plate connecting straps, said plate connector lugs being positioned transversely of said frame means in spaced side-by-side relationship and said openings each having a side adjacent to and extending along said opposite ends adapted to substantially abut the outer edges of plate connector lugs positioned in the openings, means for closing the bottom of said openings comprising thin comb plates extending transversely of said frame means, means slidably supporting said comb plates adjacent to the underside of said frame means for sliding movement from a position adjacent to the sides of said openings remote from said opposite ends to a position substantially closing said openings, said comb plates each having prongs extending from one edge thereof toward said opposite ends adapted to register with the spaces between the connector lugs and spaced apart a distance equal to the thickness of a plate connector lug so as to pass between plate connector lugs positioned in said openings and closely fit the adjacent plate connector lugs to close the space therebetween, and means for moving said comb plates between their positions.

11. In an apparatus for burning plate connector straps to an assembled lead-acid type battery element, a battery element holder comprising means defining a horizontal base for supporting battery elements, first and second spaced, opposed abutment means defining opposed parallel walls extending perpendicularly to said base and adapted to receive therebetween an assembled battery element positioned in an upright position on said base with the bottoms of the plate separators flush with the bottoms of the positive and negative plates and with the faces of the plates parallel with the said walls, means supporting one of said abutment means for movement in a first direction toward the other abutment means to exert a clamping force on a battery element intermediate said first and second abutment means and in a second direction away from said other abutment means, cam means connected to one of said abutment means operable for moving said one abutment means in one of said directions, means connected to said one abutment means for yieldably urging the latter in said other direction, and means for closing the top of the space between said abutments when said abutment means are in a position clamping an assembled battery element therebetween comprising a frame member adapted to be lowered onto the battery element and having first and second spaced enclosed openings adjacent opposite edges thereof adapted to receive respectively the vertically extending side-by-side plate connector lugs of positive battery plates and negative battery plates of an assembled battery element and positive and negative plate connecting straps, said openings each having a side adjacent to and extending along the adjacent edge of said opposite edges and adapted to substantially abut the outer edges of the plate connector lugs received by the opening, means for closing the bottoms of said openings comprising first and second comb plates intermediate said openings adjacent to the bottoms thereof, means mounting said comb plates adjacent the underside of said frame member for movement from a position intermediate said openings to a position for closing the respective openings, said comb plates having spaced prongs extending in the direction of the opening closed thereby and spaced apart a distance substantially equal to the thickness of a lug so as to pass between the plate connector lugs positioned in the opening and closely fit the adjacent plate connector lugs to substantially close the opening, and means connected to said comb plates for moving the latter between their respective positions.

12. In an apparatus for burning plate connecting straps to assembled lead-acid type battery elements, a frame, an endless conveyor comprising a plurality of battery element holders carried by said frame for movement in a closed path through successive stations including an element holder loading station and a plate connecting strap burning station, said holders each comprising means connected to said conveyor and defining a substantially horizontal base, first and second spaced, opposed, relatively movable wall-like members having their adjacent surfaces parallel and extending perpendicularly to the base defined by the first-said means and adapted to receive therebetween an unburned assembled battery element supported in an upright position on the first-said means, means connecting said first member to said conveyor, and means supporting said second member on said conveyor for movement toward and away from said first member, burning means on said frame above said holders and comprising said burning station for burning plate connecting straps to the assembled elements as the element holders move successively through said burning stations on said conveyor, means connected to said one second member of each holder for moving the second member toward and away from said first member of each holder, yieldable means on said frame for the last-said means for obtaining movement of the second member of each holder to clamp an assembled battery element therebetween, baffle means for each holder adapted to be lowered onto the top of said members of each holder, each of said baffles comprising a frame member, first and second spaced enclosed openings adjacent opposite edges thereof adapted to receive respectively the vertically extending side-by-side plate connector lugs of positive battery plates and negative battery plates of an assembled battery element and positive and negative plate connecting straps, said openings each having a side adjacent to and extending along the adjacent edge of said opposite edges and adapted to substantially abut the outer edges of the plate connector lugs received by the opening, means for closing the bottoms of said openings comprising first and second comb plates intermediate said openings adjacent to the bottoms thereof, means mounting said comb plates adjacent the underside of said frame member for movement from a position intermediate said openings to a position for closing the respective openings, said comb plates having spaced prongs extending in the direction of the opening closed thereby and spaced apart a distance substantially equal to the thickness of a lug so as to pass between the plate connector lugs positioned in the opening and closely fit the adjacent plate connector lugs to substantially close the opening, and means connected to said comb plates for moving the latter between their respective positions, and cam means on said frame for said means connected to said second member for moving said second member for obtaining movement of said second member in timed relation to the movement of said conveyor in a direction to release an assembled battery element clamped therebetween after said holders have passed said burning station.

13. In an apparatus for burning plate connecting straps to assembled lead-acid type battery elements, a frame, an endless conveyor comprising a plurality of battery element holders carried by said frame for movement in a closed path through successive stations including an element holder loading station and a plate connecting strap burning station, said holders each comprising substantially horizontal means connected to said conveyor and defining a substantially horizontal base, first and second spaced, opposed, relatively movable wall-like members having their adjacent surfaces parallel and extending perpendicularly to the base defined by the first-said means and adapted to receive therebetween an unburned assembled battery element supported in an upright position on the first-said means, means connecting said first member to said conveyor, means supporting the said second member for movement in a first direction toward and in a second direction away from said first member, burning means on said frame above said holders and comprising said burning station for burning plate connecting straps to the assembled elements as the element holders move successively through said burning stations on said conveyor, said supporting means for said second members of said holders including yieldable means for obtaining movement of said second members to clamp toward an assembled battery element between said members to clamp same as the holders leave said loading station, baffle means for each holder adapted to be lowered onto and close the top of the said members of the holder, each of said baffles comprising a frame member having a pair of spaced, enclosed openings adjacent opposite edges thereof adapted to receive respectively the vertically extending side-by-side plate connector lugs of positive battery plates and negative battery plates of an assembled battery element and positive and negative plate connecting straps, said openings each having a side adjacent to and extending along the adjacent edge of said opposite edges and adapted to substantially abut the outer edges of the plate connector lugs received by the opening, means for closing the bottoms of said openings comprising first and second comb plates intermediate said openings adjacent to the bottoms thereof, means mounting said comb plates adjacent the underside of said frame member for movement from a position intermediate said openings to a position for closing the respective openings, said comb plates having spaced prongs extending in the direction of the opening closed thereby and spaced apart a distance substantially equal to the thickness of a lug so as to pass between the plate connector lugs positioned in the opening and closely fit the adjacent plate connector lugs to substantially close the opening, and means connected to said comb plates for moving the latter between their respective positions, and said supporting means for said second members of said holders including cam means for cooperating with said second members for obtaining movement of said second members to release an assembled battery element clamped therebetween after said holders have passed said burning station.

14. In an apparatus for burning plate connecting straps to assembled lead-acid type battery elements, a frame, an endless conveyor comprising a plurality of battery element holders carried by said frame for movement in a closed path through successive stations including an element holder loading station and a plate connecting strap burning station, said holders each comprising means connected to said conveyor and defining a substantially horizontal base, first and second spaced, opposed, relatively movable wall-like members having their adjacent surfaces parallel and extending perpendicularly to the base defined by the first-said means and adapted to receive therebetween an unburned assembled battery element supported in an upright position on the first-said means, means connecting said first member to said conveyor, means supporting said second member on said conveyor for movement toward and away from said first member, means connected to said one second member of each holder for yieldably forcing the second member towards said first member of each holder, and cam means on said frame operative to move the second member for each holder to unclamp an assembled battery element therebetween in timed relation to the movement of the holders from said burning station.

References Cited in the file of this patent

UNITED STATES PATENTS

| | | |
|---|---|---|
| 871,393 | Flanders | Nov. 19, 1907 |
| 1,358,869 | Norris | Nov. 16, 1920 |
| 1,389,155 | Norris | Aug. 30, 1921 |
| 1,396,162 | Campbell et al. | Nov. 8, 1921 |
| 1,531,753 | Norris | Mar. 31, 1925 |
| 1,715,020 | Von Grimmenstein | May 28, 1929 |
| 1,932,136 | Hole | Oct. 24, 1933 |
| 1,960,195 | Nyce | May 22, 1934 |
| 2,265,413 | Young | Dec. 9, 1941 |
| 2,430,188 | Sargent | Nov. 4, 1947 |
| 2,505,514 | Anderson | Apr. 25, 1950 |
| 2,516,546 | Brown | July 25, 1950 |
| 2,539,318 | Orsino | Jan. 23, 1951 |